(12) United States Patent
Chen et al.

(10) Patent No.: US 9,760,996 B2
(45) Date of Patent: Sep. 12, 2017

(54) NON-RIGID REGISTRATION FOR LARGE-SCALE SPACE-TIME 3D POINT CLOUD ALIGNMENT

(71) Applicant: Nokia Technologies Oy, Espoo (FI)

(72) Inventors: Xin Chen, Evanston, IL (US); Ruigang Yang, Lexington, KY (US)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 14/823,526

(22) Filed: Aug. 11, 2015

(65) Prior Publication Data
US 2017/0046840 A1 Feb. 16, 2017

(51) Int. Cl.
| | |
|---|---|
| *G06T 17/10* | (2006.01) |
| *G06T 3/00* | (2006.01) |
| *G06T 7/00* | (2017.01) |
| *G06K 9/46* | (2006.01) |
| *G06K 9/62* | (2006.01) |
| *G01C 21/36* | (2006.01) |
| *G06K 9/00* | (2006.01) |
| *G06T 7/30* | (2017.01) |

(52) U.S. Cl.
CPC .......... *G06T 7/0028* (2013.01); *G01C 21/36* (2013.01); *G06K 9/00201* (2013.01); *G06K 9/00791* (2013.01); *G06K 9/4604* (2013.01); *G06K 9/6201* (2013.01); *G06T 3/0068* (2013.01); *G06T 7/0081* (2013.01); *G06T 7/30* (2017.01); *G06T 2207/10028* (2013.01); *G06T 2207/30248* (2013.01)

(58) Field of Classification Search
CPC ...... G06T 2207/10028; G06T 7/0028–7/0032; G06T 2200/04; G06T 2219/2004; G06K 9/00214
See application file for complete search history.

(56) References Cited

U.S. PATENT DOCUMENTS

| | | | |
|---|---|---|---|
| 8,879,828 B2 | 11/2014 | Bell et al. | |
| 9,454,796 B2 * | 9/2016 | Seitz | G06K 9/6202 |
| 2015/0254857 A1 * | 9/2015 | Huang | G06F 19/3406 |
| | | | 382/154 |

FOREIGN PATENT DOCUMENTS

| | | |
|---|---|---|
| CN | 102034275 | 4/2011 |
| GB | 2389500 | 12/2003 |
| WO | WO2010104614 | 9/2010 |

OTHER PUBLICATIONS

Stefan Birmanns et al., "Multi-resolution anchor-point registration of biomolecular assemblies and their components", Elsevier, Journal of Structural Biology 157 (2007) 271-280.*

(Continued)

*Primary Examiner* — Brian P Werner
(74) *Attorney, Agent, or Firm* — Lempia Summerfield Katz LLC

(57) ABSTRACT

Point cloud data sets representing overlapping physical areas are received. Surface feature points are extracted from the point cloud data sets and coordinates are determined for each point of the point cloud data sets. The point cloud data sets are aligned based on matching surface feature points between the point cloud data sets. Matched surface feature points are moved toward the coordinates of corresponding matched surface feature points and the remaining points are moved based on the moved matched surface feature points and the determined coordinates for each point.

20 Claims, 7 Drawing Sheets

(56) References Cited

OTHER PUBLICATIONS

Brown et al., Global Non-Rigid Alignment of 3D Scans, 2007, ACM Transactions on Graphics.
Dai et al., Multi-Modal Image Registration with Hyperspectral Data, Aug. 7, 2009.
Desbrun et al., Implicit Fairing of Irregular Mesher Using Diffusion and Curvature Flow, 1999, pp. 317-324, Proceedings of Siggraph.
Gal et al., Salient Geometric Features for Partial Shape Matching and Similarity, 2006, ACM Transactions on Graphics.
Kaestner et al., A Non-Rigid Approach to Scan Alignment and Change Detection Using Range Sensor Data, 2006, Field and Service Robotics, Springer Berlin Heidelberg.
Lee et al., Mesh Saliency, 2005, ACM Transactions on Graphics.
Novatnack et al., Scale-Dependent 3D Geometric Features, 2007, pp. 1-8, Proceedings of IEEE International Conference on Computer Vision.
Sun et al., A Concise and Provably Informative Multi-Scale Signature Based on Heat Diffusion, 2009, in Eurographics Symposium on Geometry Processing.

* cited by examiner

NON-RIGID REGISTRATION FOR LARGE-SCALE SPACE-TIME 3D POINT CLOUD ALIGNMENT

FIELD

The following disclosure relates to alignment of multiple three-dimensional point cloud scans, and more particularly, to the reduction of distortion within large-scale scans using non-rigid transformations.

BACKGROUND

Computer based navigation systems such as autonomous driving vehicles and mapping applications have created a need to acquire large area scans, photographs, and point cloud data sets (point cloud data sets include data sets obtained by remote sensing using infrared lasers, often called Light Detection And Ranging, or LiDAR). Large scale LiDAR scans (such as a scan of several city blocks) may be captured from either ground or aerial based mobile platforms. Despite the use of multi-band global positioning systems (GPS) and high-precision inertial measurement unit (IMU) with these systems, registration errors occur when aligning scans. Errors in misalignment and inaccurate registration can be as big as a few meters, even with the most accurate and expensive scanning equipment. Scans may additionally have non-rigid distortions; one example is a straight line appearing as curved in the scanned data. Non-linear distortions, which are typically caused by the scanner's internal drift, cannot be resolved by rigid transformation.

Current methods of resolving registration and deformation errors include iterative closest point (ICP) variants. ICP methods estimate a rigid transformation between two point clouds but fail to resolve non-rigid deformation and are thus inaccurate in aligning large-scale urban environment scans. ICP methods and ICP variants are further ineffective when ground truth or reference data for the point clouds are unavailable.

SUMMARY

In one embodiment, an anchor point cloud data set and at least one corresponding point cloud data set are received, wherein at least a portion of the anchor point cloud data set and at least a portion of the corresponding point cloud data set represent the same physical surface. The method may include extracting a plurality of surface feature points from the anchor point cloud data set and from the at least one corresponding point cloud data set and determining coordinates for each point of the anchor point cloud data set and the at least one corresponding point cloud data set. The method may further include matching surface feature points of the plurality of surface feature points between the anchor point cloud data set and the at least one corresponding point cloud data set and aligning the at least one corresponding point cloud data set to the anchor point cloud data set based on the matched surface feature points between the anchor point cloud data set and the at least one corresponding point cloud data set. The method may include moving matched surface feature points of the corresponding point cloud data set toward the coordinates of the matched surface feature points of the anchor point cloud data set and moving the remaining points of the at least one corresponding point cloud data set based on the moved matched surface feature points and the determined coordinates for each remaining point.

In one embodiment, an apparatus is provided comprising at least one processor and at least one memory including computer program code for one or more programs. The at least one memory and the computer program code configured to, with the at least one processor, cause the apparatus to receive an anchor point cloud data set and at least one corresponding point cloud data set, wherein at least a portion of the anchor point cloud data set and at least a portion of the corresponding point cloud data set represent the same physical surface, extract a plurality of surface feature points from the anchor point cloud data set and from the at least one corresponding point cloud data set, and determine coordinates for each point of the anchor point cloud data set and the at least one corresponding point cloud data set. The computer program code and processor may further cause the apparatus to match surface feature points of the plurality of surface feature points between the anchor point cloud data set and the at least one corresponding point cloud data set, align the at least one corresponding point cloud data set to the anchor point cloud data set based on the matched surface feature points between the anchor point cloud data set and the at least one corresponding point cloud data set, and divide the aligned at least one corresponding point cloud data set and the anchor point cloud data set into a plurality of point cloud data set portions, wherein each point cloud data set portion overlaps with at least one other point cloud data set portion. The computer program code and process may further cause the apparatus to, for each point cloud data set portion, move matched surface feature points of the corresponding point cloud data set toward the determined coordinates of the matched surface feature points of the anchor point cloud data set, and for each point cloud data set portion, move the remaining points of the at least one corresponding point cloud data set based on the moved matched surface feature points and the determined coordinates for each remaining point.

In yet another embodiment, a non-transitory computer readable medium including instructions that when executed are operable to receive an first point cloud and a second point cloud, extract a plurality of surface feature points from the first point cloud and from the second point cloud, and match surface feature points of the plurality of surface feature points between the first point cloud and the second point cloud. The non-transitory computer readable medium may further include instructions that when executed are operable to align the second point cloud to the first point cloud based on the matched surface feature points, move matched surface feature points of the second point cloud toward the matched surface feature points of the first point cloud, and move the remaining points of the second point cloud based on the moved matched surface feature points.

BRIEF DESCRIPTION OF THE DRAWINGS

Exemplary embodiments are described herein with reference to the following drawings.

DETAILED DESCRIPTION

Multiple three-dimensional scans of the same geographic area or physical object are used in map navigation and urban planning. These scans may be collected at different times: within minutes, days, or years between the scan. Scans that are collected with the aid of a vehicle may have offsets of several meters due to variations in driving. Artifacts may appear in the scans as non-rigid distortions due to the system drift or due to calibration error.

The subject technology for non-rigid alignment addresses the alignment of multiple point cloud data scans into a common coordinate plane for point cloud data sets of the same geographic area and effectively resolves non-rigid distortion. One goal of the subject technology for non-rigid alignment is to improve data registration accuracy in the presence of non-rigid distortion. A further goal is to conduct non-rigid transformations on large data sets without exceeding the computational capabilities of a system. Yet another goal of the subject technology for non-rigid alignment is to provide non-rigid registration using local features such as surface feature points and to provide a linear, closed-form solution for non-rigid alignment. A further goal of the subject technology for non-rigid alignment is to provide correct both local and global deformation in a unified framework without the need for local-deformation algorithms.

End user applications of the subject technology for non-rigid alignment include autonomous vehicles, map navigation, urban planning, construction, as well as any other application where change detection is desirable. A benefit of the subject technology for non-rigid alignment is the reduction of registration errors and non-linear distortion, which can cause false positives in change detection applications. While the methods and systems herein may be applied to smaller data scans (such as pictures taken with mobile phones, handheld scans, and scans of small areas), smaller data sets frequently do not encounter the degree of non-linear distortion that arises with larger data sets. For example, there may be no noticeable drift or non-linear distortions in smaller scans of areas under approximately twenty meters.

Figure 1:
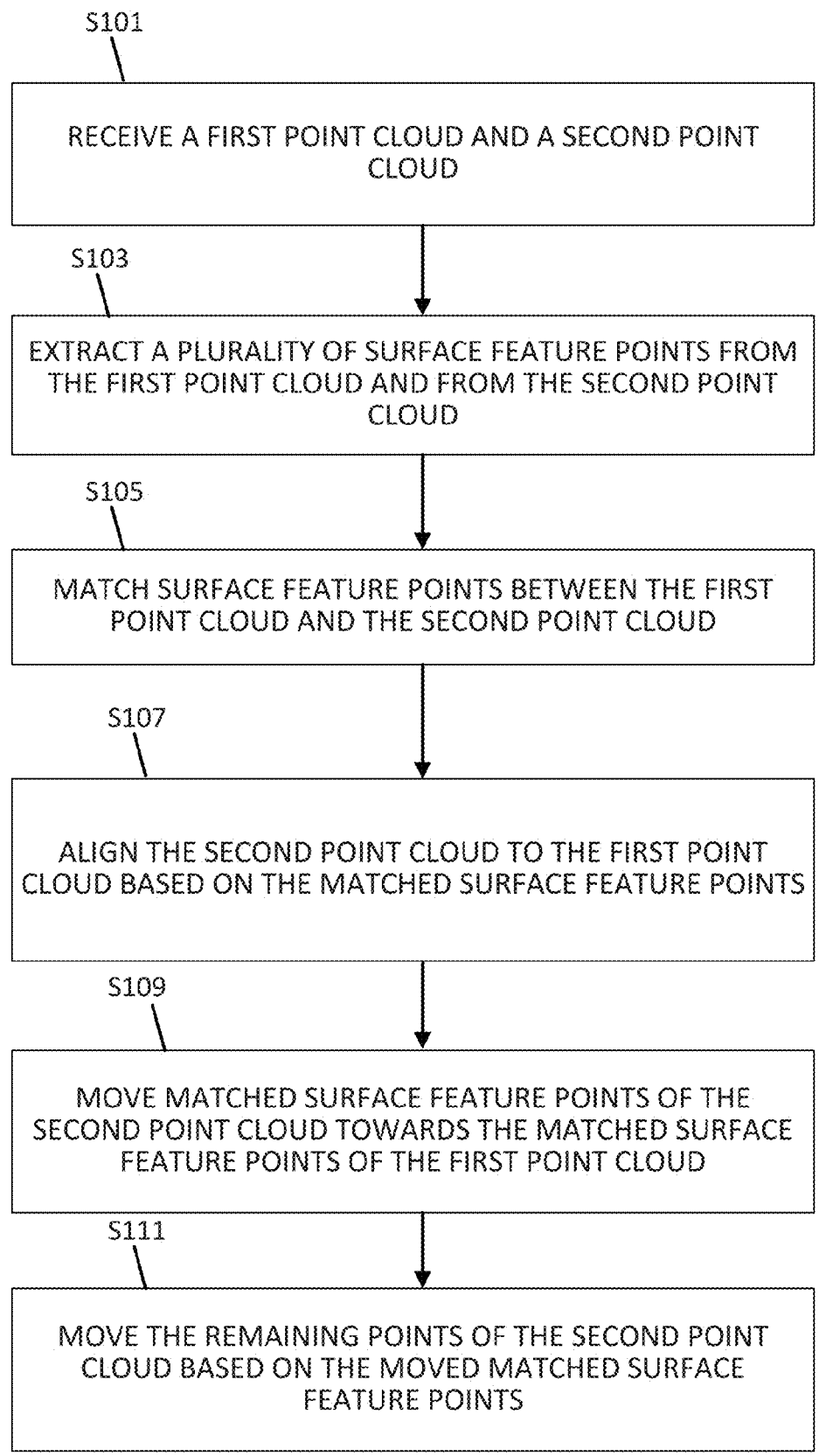
FIG. 1 is a flow diagram in accordance with the subject technology for non-rigid alignment.

FIG. 1 is a flow diagram in accordance with the subject technology for non-rigid alignment. In act S101, a first point cloud and a second point cloud are received by server 125 that may be collected by vehicles (aerial or ground) 129. For example, point cloud data sets may be obtained by LiDAR scans collected by airplanes. The point cloud scans may, for example, be two scans of roughly the same urban scene. The point cloud scans may include several of the same city blocks but the point clouds may cover more or less geographic area in one or more directions. In act S103, a plurality of surface feature points are extracted via processor 300 of server 125 from the first point cloud and from the second point cloud. Surface feature points of the point clouds provide enough detail to roughly align the two scans. Surface feature points may represent a change in color, texture, or change of plane to neighboring points. Surface feature points may, but need not, represent different objects in the geographic area. In act S105, surface feature points are matched by processor 300 of server 125 between the first point cloud and the second point cloud. Once extracted, in act S107, the second point cloud is roughly aligned by the processor 300 of server 125 to the first point cloud based on the matched surface feature points. The alignment may be carried out by a rigid transform including one or more rotation, translation, reflection, or combination thereof. Due to errors in the scans, surface feature points may not be fully aligned following the rigid transform. Non-rigid transformation in acts S109 and S111 may then achieve a closer alignment of the two point cloud scans. In act S109, the matched surface feature points of the second point cloud are moved towards the matched surface feature points of the first point cloud. In act S111, the remaining points of the second point cloud are moved based on the moved, matched surface feature points.

Figure 2:
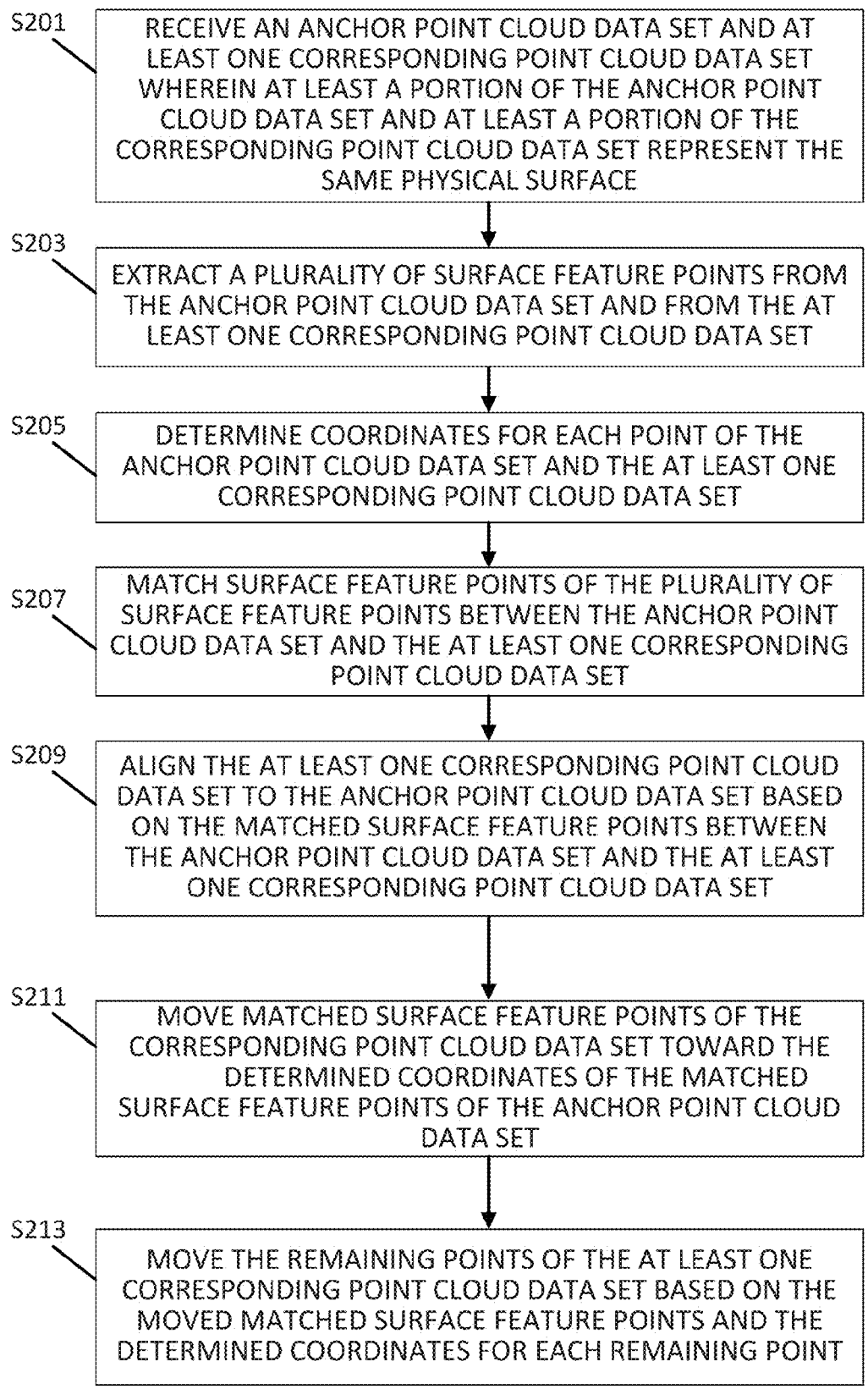
FIG. 2 is a flow diagram in accordance with the subject technology for non-rigid alignment.

FIG. 2 is a flow diagram in accordance with a method of the subject technology for non-rigid alignment that may be performed by server 125. Acts are described with reference to the system and components depicted in FIGS. 5-7. Additional, different, or fewer acts may be provided. Acts may be performed in orders other than those presented herein. In act S201, server 125 receives an anchor point cloud data set and at least one corresponding point cloud data set, wherein at least a portion of the anchor point cloud data set and at least a portion of the corresponding point cloud data set represent the same physical surface. The anchor point cloud data set and all corresponding point cloud data sets may be stored in databases 123. In one non-limiting example, several point cloud data sets may represent a geographic area such as the one depicted in FIG. 4, image 90. Multiple scans may be registered with one another. One of the point cloud data sets may be designated as the anchor point cloud data set and the remaining point cloud data sets may be designated as corresponding point cloud data sets. The points of all corresponding point cloud data sets are then conformed to the anchor point cloud data set. A point cloud data set that has been designated as the anchor point cloud data set in one transformation may be designated as the corresponding point cloud data set in subsequent transformations with additional data sets. At least a portion of the anchor point cloud data set for non-rigid transformation must represent common physical area with the corresponding point cloud data set. An anchor point cloud data set may have multiple corresponding point cloud data sets. These multiple corresponding point cloud data sets need not represent any common physical areas to other corresponding point cloud data sets. Point cloud data sets may be collected using moving vehicles 129 and or mobile devices 122. Although point cloud data sets may include rotational information from the collection parameters, such information is not necessary to achieve the non-rigid alignment as disclosed herein.

In act S203, a plurality of surface feature points from the anchor point cloud data set are extracted by processor 300 of server 125 and from the at least one corresponding point cloud data set. Surface feature points may represent corners of the present in the corresponding physical area. Further computation or semantic segmentation are not necessary to identify objects or classify shapes during this step, which furthers a goal of the disclosure of minimizing necessary computation to perform the non-rigid alignment. Color or texture variations may be used as alternative feature points in some embodiments. In some embodiments, color or texture information need not be present. The extracted surface feature points may be any local variation in the point cloud, including variations based on characteristics including the normal of the points and/or curvature. In one embodiment, a heat kernel signature (HKS), which indicates heat diffusion over surfaces over time, may be used to extract the surface feature points. The HKS is an intrinsic property that indicates the diffusion process in different time (scales). Merits of HKS include stableness, multi-scale, isometric invariance, and informativeness. HKS is a local characteristic determined by a neighbor patch of a point, and the size of the patch is controlled by time. Hence, it is stable for any topological or geometric changes outside the local patch. Variations in thresholds for the HKS provide the ability to control the number of detected features. Other methods of feature detection may be used.

In act S205, coordinates are determined by processor 300 of server 125 for each point of the anchor point cloud data set and the at least one corresponding point cloud data set. The determined coordinates may be based on the location of neighboring points. Laplacian coordinates may be used to represent the neighboring points without use of a mesh algorithm. Each point of the anchor point cloud and the corresponding point clouds may be defined by its Laplacian coordinate. For substantially uniformly sampled points of a point cloud, the Laplacian coordinate L of a point $\vec{v}_i$ may be defined by Equation 1:

$$L(\vec{v}_i) = \vec{v}_i - \frac{1}{d_i}\sum_{j \in N_i} \vec{v}_j \qquad \text{Eq. 1}$$

where a set of points $V=\{\vec{v}_i, \ldots, \vec{v}_n\}$ defines the set of points in corresponding point cloud $P_1$ or the set of points in anchor point cloud $P_0$, and $N_i$ is the set of neighboring points to $\vec{v}_i$. The total number of points in $N_i$ are denoted by $d_i$. Accordingly, the Laplacian coordinate as determined in Equation 1 for each point is in fact the difference between the mean value of neighboring points $N_i$ and point $\vec{v}_i$.

In act S207, surface feature points of the plurality of surface feature points are matched by processor 300 of server 125 between the anchor point cloud data set and the at least one corresponding point cloud data set. In act S209, the at least one corresponding point cloud data set is aligned to the anchor point cloud data set by processor 300 of server 125 based on the matched surface feature points between the anchor point cloud data set and the at least one corresponding point cloud data set. Surface feature points may be matched using random sample consensus (RANSAC). RANSAC may be used even for sparse feature sets with a minimum of three pairs of point correspondences.

Three points may be randomly selected to estimate a rigid transformation, and the number of inliers are counted. Inliers may be determined as features from the two point cloud data sets that are within a threshold distance following rigid transformation. In one example of a threshold distance Δ, inliers may be defined as Equation 2:

$$\|p-[R,t]\cdot q\| < \Delta \qquad \text{Eq. 2}$$

where p in anchor point cloud $P_0$ and q in corresponding point cloud $P_1$ represent two surface feature points and [R, t] is the estimated rigid transformation. This procedure may be repeated multiple times, and the matching solution with the largest amount of inliers may be selected. The matching solution may be determined as a maximization of an objective function based on the geometric distances at a specific time as expressed by the HKS features. In the matching solution, the difference between potentially matched surface feature points may be computed as the square root of the sum of an expression of HKS features that must fall below a threshold to determine whether the surface feature points match. Inliers thus equal matching surface pairs between the anchor point cloud and the corresponding point cloud. Simultaneously, this process finds a rigid transformation to align the two data sets together. Following this rigid transformation, the point cloud data sets can be further aligned using the matched surface feature points, which further resolves non-rigid distortion issues. Matched pairs of surface feature points may further include a matching score indicating the likelihood of match, which may be expressed as a percentage. The matching solution may include expressing the relationship of each matching pair with an affinity matrix establishing whether potential matching pairs fit geometrically. The affinity matrix may be based on geometric distance between potential matching surface feature pairs.

In act S211, matched surface feature points of the corresponding point cloud data set are moved towards the determined coordinates of the matched surface feature points of the anchor point cloud data set via the processor 300 of server 125. In act S113, the remaining points of the at least one corresponding point cloud data set are moved based on the moved, matched surface feature points and the determined coordinates for each point via processor 300 of server 125. Matching surface feature point pairs are given by $\vec{u}_i$ on anchor point cloud data set $P_0$ and $\vec{v}_i$ on corresponding point cloud data set $P_1$. In order to align the point cloud data sets, matching surface feature point pairs are aligned by moving $\vec{v}_i$ as close as possible to the position of $\vec{u}_i$. The remaining points of corresponding point cloud $P_1$ are additionally moved (i.e., warping the corresponding point cloud data set to align with the anchor point cloud data set). A goal is to minimize the point cloud deformation as much as possible in order to maintain shape details. A further goal is to minimize the point cloud deformation of unmatched points in $P_1$. The non-rigid alignment (i.e., movement or warping) of both the surface feature points and the remaining points of corresponding point cloud $P_1$ is performed in order to move each matched feature point closer to the corresponding surface feature point while maintaining the original $P_1$ point cloud shape as much as possible. The points of anchor point cloud $P_0$ may remain unchanged. Minimizing the corresponding point cloud data set deformation $P_1$ may be considered as a constraint in calculating movement in position over unmatched points in $P_1$. The non-rigid alignment may be formulated as a linear solution using the quadratic energy functional minimization problem of Equation 3:

$$E(V') = \Sigma_{i \in V} \|L(\vec{v}_i) - L(\vec{v}_i')\|^2 + \Sigma_{i \in F} \|\vec{v}_i' - \vec{u}_i\|^2 \qquad \text{Eq. 3}$$

where V' is the point position after it has been moved, and F is the correspondence subset ($F \subseteq V$). Equation 3 establishes that Laplacian coordinates $\vec{v}_i$ should be as close as possible to $\vec{v}_i'$ and establishes that the new position for points $\vec{v}_i$ that belong to the feature set F, should be as close to respective corresponding points $\vec{u}_i$. The first sum of Equation 3 measures the shape similarity before and after changing the position of the points using Laplacian coordinates, whose least square solution is a linear system expressed as Equation 4:

$$M_L V' = L, V' = \begin{bmatrix} \vec{v}'_1 \\ \vdots \\ \vec{v}'_n \end{bmatrix}, L = \begin{bmatrix} L(\vec{v}_i) \\ \vdots \\ L(\vec{v}_n) \end{bmatrix} \quad \text{Eq. 3}$$

where $M_L$ is the Laplacian matrix of the point cloud. The second sum of Equation 3 gives the sum of squared differences over all matched surface feature points, whose solution is given by Equation 5:

$$M_I V' = U, U = \begin{bmatrix} u_{i0} \\ u_{i1} \\ \vdots \end{bmatrix} \quad \text{Eq. 5}$$

Similar to an identify matrix, $M_I$ is a non-square matrix composed of zeros and ones, in which a row stands for a matched feature in anchor point cloud $P_0$ and a column stands for a point in corresponding point cloud $P_1$. Each row has exactly one non-zero entry if and only if the two points are matching surface feature points. Stacking $M_L$ and $M_I$ together, an overdetermined linear system is obtained in order to find the overall least square solution to Equation 3 and may be expressed as Equation 6:

$$\begin{bmatrix} M_L \\ M_I \end{bmatrix} V' = \begin{bmatrix} L \\ U \end{bmatrix} \quad \text{Eq. 6}$$

Alternative embodiments may include alternative non-rigid deformation schemes such as thin-plate deformation or embedded deformation. However, Laplacian based deformation has the benefit of being computationally efficient.

The non-rigid alignment solution described in FIG. 1 requires solving a large matrix that is approximately on the order of n×n where n is the number of points in the corresponding point cloud data set. Solving a large matrix may be problematic due to the limitations of memory and processing speed of various computers. A goal of the disclosure is to reduce memory load and expedite processing. Accordingly, in some embodiments, the point cloud data sets are divided into portions so that the non-rigid alignment is performed in an overlapping piecewise fashion. The anchor and corresponding point cloud data sets are divided into overlapping segments of anchor point cloud data set portions with corresponding point cloud data set portions. Overlapping areas may have multiple matched surface feature points. Within each segment, non-rigid alignment is performed (for example, as shown in FIG. 1) using a sliding window approach.

Figure 3:
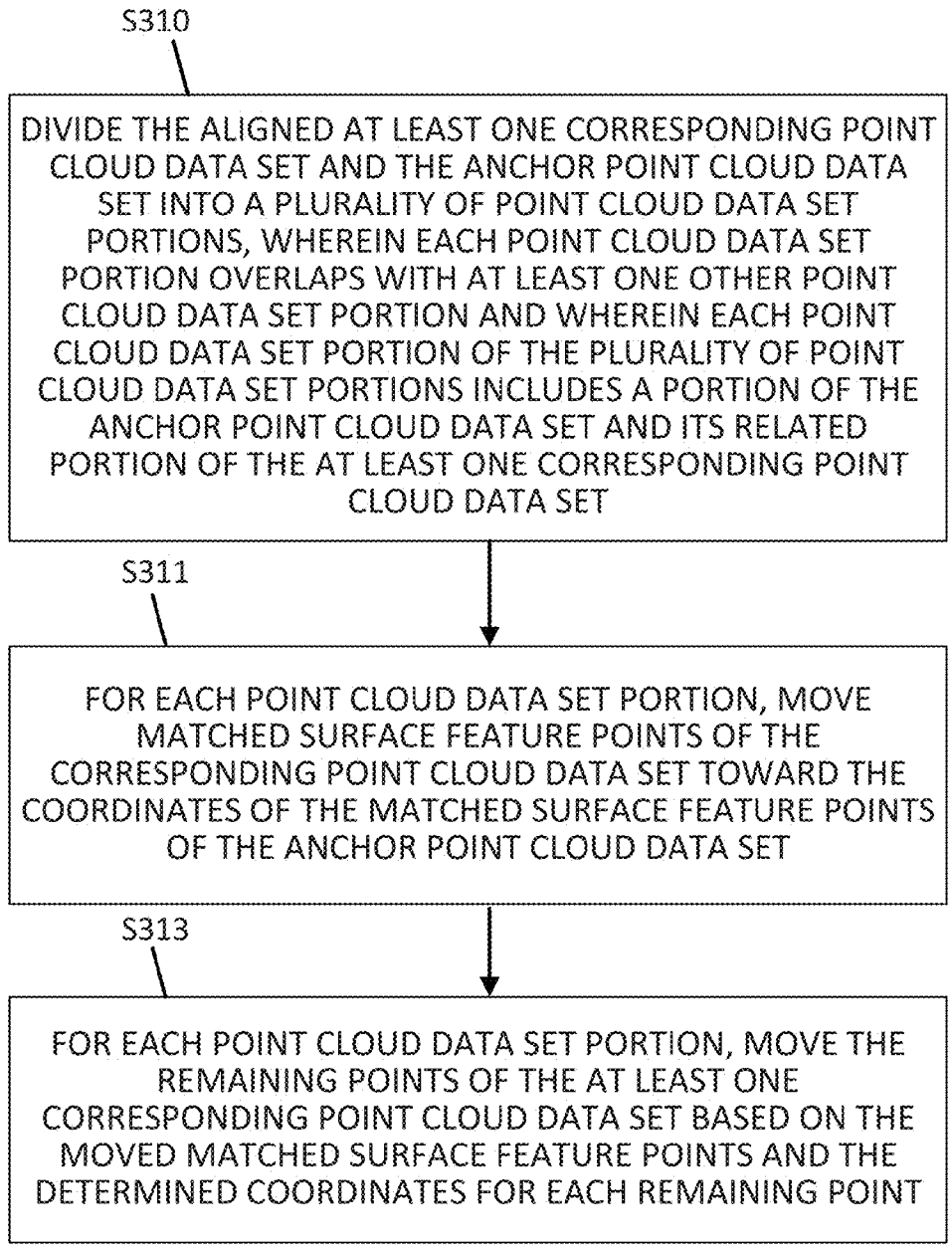
FIG. 3 is a flow diagram in accordance with the subject technology for non-rigid alignment.

Because matched surface feature points appear in overlapping portions, the non-rigid alignment may effectively favor points in the overlap region to converge to the same locations in all overlapping portions. FIG. 3 is a flow diagram in accordance with the subject technology for non-rigid alignment that may be performed by server 125. The acts of FIG. 3 may be performed as part of the method illustrated in FIG. 1 or FIG. 2. For example, act S310 in some embodiments may occur after act S209. In some embodiments, acts S311 and S313 illustrate one exemplary way of performing acts S211 and S213.

In act S310, the aligned at least one corresponding point cloud data set and the anchor point cloud data set are divided into a plurality of point cloud data set portions, wherein each point cloud data set portion overlaps with at least one other point cloud data set portion. Each point cloud data set portion of the plurality of point cloud data set may include a portion of the anchor point cloud data set and the related portion of the at least one corresponding point cloud data set. Overlapping portions of point cloud data sets may contain substantially uniform divisions by creating a substantially equal number of points (e.g., a substantially uniform division of three-dimensional pixels called voxels) in each portion. Alternatively, the division of overlapping portions may be based on the density of surface feature points. For example, a threshold may be used to establish a minimum number of surface feature points that are common to overlapping portions. A minimum number of common surface feature points in each portion ensures that the overlapping portions may be accurately merged following the piecewise non-rigid transformation of individual portions. Some embodiments may include additional thresholds including a maximum number of points in each overlapping portion. A maximum threshold may be based on the computational limitations of processor 300 of the system. The division of portions of overlapping coordinates may be performed at a variety of different times in the method. For example, the division of the overlapping portions could be made after extracting surface feature points. As long as the division of portions of overlapping coordinates occurs before the linear transformation, computational space is preserved.

In act S311, for each point cloud data set portion, the matched surface feature points of the corresponding point cloud data set may be moved toward the coordinates of the matched surface feature point of the anchor point cloud data set. In act S313, for each point cloud data set portion, the remaining points of the at least one corresponding point cloud data set are moved based on the moved, matched surface feature points and the determined coordinates for each remaining point. Once each point has been moved, the plurality of point cloud data set portions may be merged into a single point cloud data set including each moved surface feature points and the determined coordinates for each point. Merging the overlapping point cloud data set portions may include removing duplicative point information. The merged single point cloud data set representing the physical area of the anchor point cloud data set and the corresponding point cloud data set may be used to determine the navigational directions. Navigational directions may include map information or other information to facilitate autonomous driving applications. The determined navigational directions may be provided to an autonomous vehicle. A benefit of the disclosure is providing accurate and precise map information through the resolution of alignment errors and non-rigid distortion. The merged single point cloud data representing the physical area of the anchor point cloud data set and the corresponding point cloud data set may be used to facilitate urban planning. Building plans may be created or modeled using the merged single point cloud data.

Figure 4:
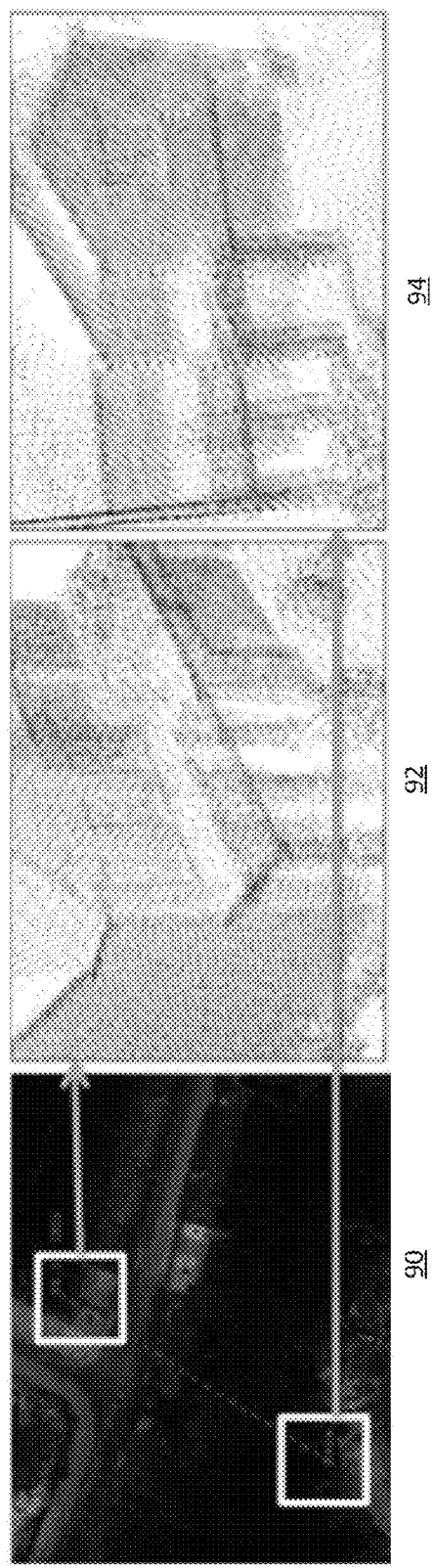
FIG. 4 illustrates registered maps and distortion that cannot be corrected with a rigid transformation.

FIG. 4 illustrates registered maps and distortion that cannot be corrected with a rigid transformation, thus requiring a non-rigid transformation to resolve the registration errors. Image 90 represents a geographic area that has been LiDAR scanned twice with the scans registered together. The image 92 depicts a house within the geographic area of the LiDAR scans that has been registered well. The image 94 exhibits registration errors including ghosting artifacts around the windows and wall frames. image 92 and image 94 are geographically approximately one hundred meters apart. The non-rigid transformation of the subject technology can accurately align both areas of image 92 and image 94.

Figure 5:
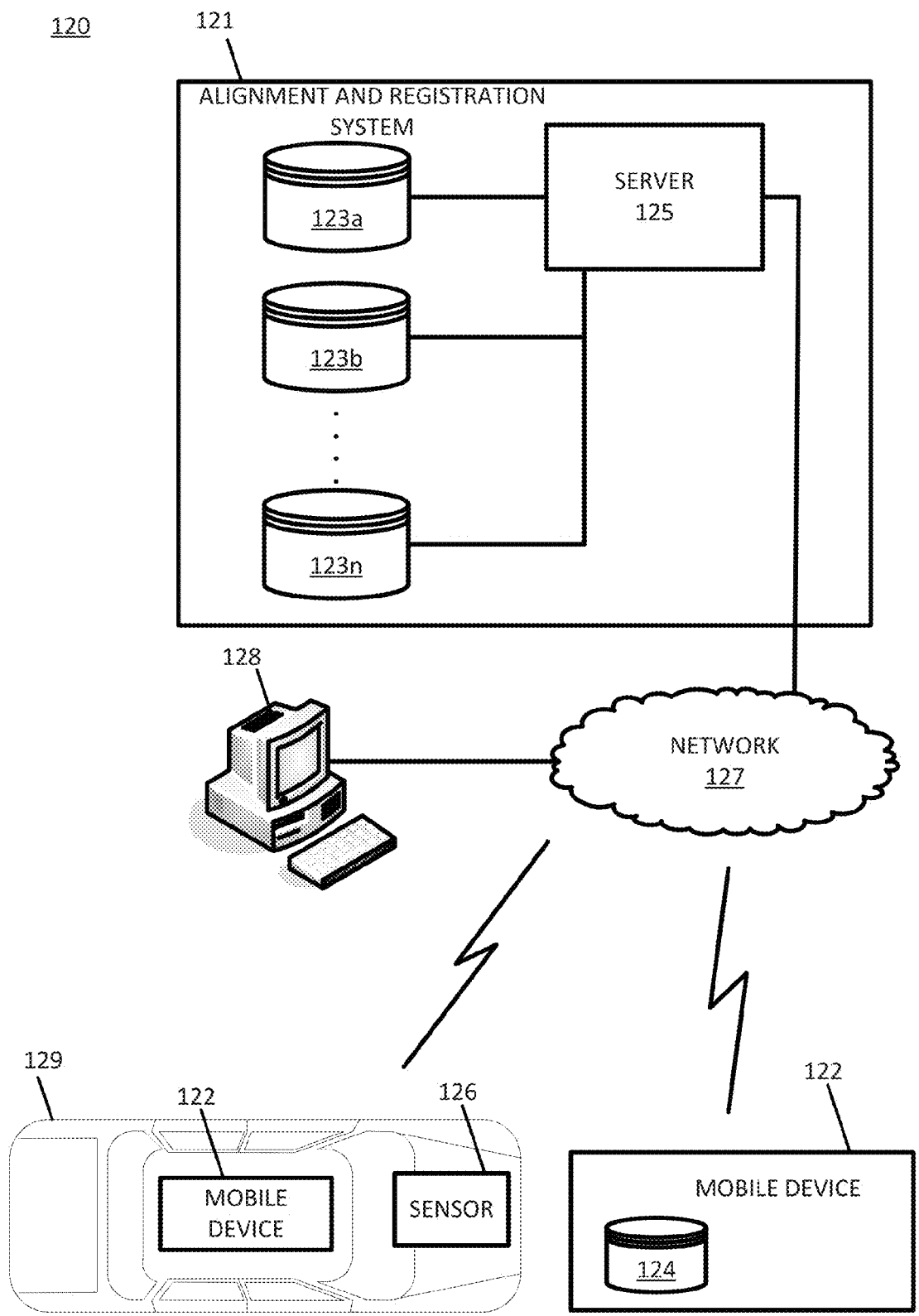
FIG. 5 illustrates an example system of the subject technology for non-rigid alignment.

FIG. 5 illustrates an example system 120 for non-rigid alignment. The system 120 includes an alignment and registration system 121, one or more mobile devices 122 (navigation devices), a workstation 128, and a network 127. The system may further include a vehicle 129 including a mobile device 122 and a sensor 126. Additional, different, or fewer components may be provided. For example, many mobile devices 122 and/or workstations 128 connect with the network 127. The alignment and registration system 121 includes a server 125 and one or more databases. The server 125 may maintain multiple databases 123a, 123b . . . 123n. The term database and refers to a set of data stored in a storage medium and may not necessarily reflect specific any requirements as to the relational organization of the data. The term server is used herein to collectively include the computing devices at the alignment and registration system 121 for creating, maintaining, and updating the multiple databases 123a-n. Any computing device may be substituted for the mobile device 122. The computing device may be a host for a website or web service such as a mapping service or a navigation service. A mapping service may provide maps generated from the databases 123a-n that have been aligned using the subject technology for non-rigid alignment, and the navigation service may calculate routing or other directions from the geographic data and aligned map information of the databases 123a-n.

Figure 6:
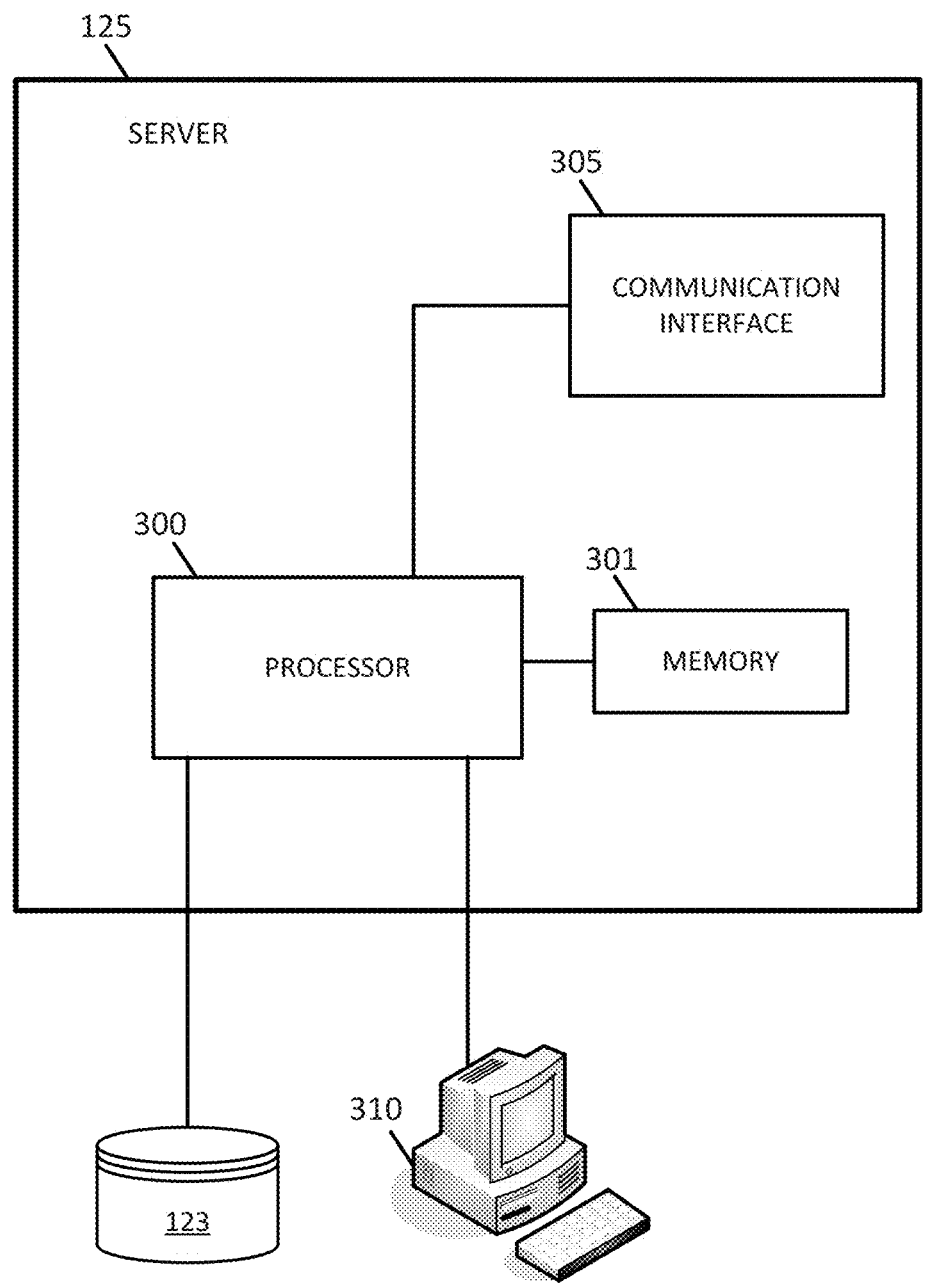
FIG. 6 illustrates an example server of the subject technology for non-rigid alignment.

The database 123a-n may include a road imagery database including street level images, point cloud data sets, aligned point cloud data sets, and/or existing map data. As shown in FIG. 6, a master copy of the database 123a may be stored at the alignment and registration system 121, and the databases 123b-n may include alternative versions or past versions of the aligned and registered scans with navigation maps. The master copy of the database 123a may be the most current or up to date copy of the database. In addition, the mobile device 122 may store a local copy of the database 124. In one example, the local copy of the database 123b is a full copy of the database, and in another example, the local copy of the database 124 may be a cached or partial portion of the database.

The local copy of the database 124 may include data from various versions of the database 123a-n. The cached portion may be defined based on a geographic location of the mobile device 122 or a user selection made at the mobile device 122. The server 125 may send lane classifier information to the mobile device 122.

The mobile device 122 may be a personal navigation device ("PND"), a portable navigation device smart phone, a mobile phone, a personal digital assistant ("PDA"), a car, a tablet computer, a notebook computer, and/or any other known or later developed connected device or personal computer. Non-limiting embodiments of navigation devices may also include relational database service devices, mobile phone devices, or car navigation devices. The vehicle 129 with mobile device 122 and sensor 126 may be an autonomous driving vehicle, a data acquisition vehicle, or a vehicle equipped with navigation or other communication capabilities.

The alignment and registration system 121, the workstation 128, the mobile device 122, and vehicle 129 are coupled with the network 127. The phrase "coupled with" is defined to mean directly connected to or indirectly connected through one or more intermediate components. Such intermediate components may include hardware and/or software-based components.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 100. The input device 203 and the display 211 may be combined as a touch screen, which may be capacitive or resistive. The display 211 may be a liquid crystal display (LCD) panel, light emitting diode (LED) screen, thin film transistor screen, or another type of display.

The processor 200 and/or processor 300 may include a general processor, digital signal processor, an application specific integrated circuit (ASIC), field programmable gate array (FPGA), analog circuit, digital circuit, combinations thereof, or other now known or later developed processor. The processor 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

FIG. 6 illustrates an example server 125. The server 125 includes a processor 300, a communication interface 305, and a memory 301. The server 125 may be coupled to a database 123 and a workstation 310. The workstation 310 may be used to enter data regarding point cloud data sets, images, map data, and threshold information. The database 123 may include information entered from workstation 310, point cloud data sets, images, map data, and thresholds information. Additional, different, or fewer components may be provided in the server 125. FIGS. 1-3 illustrate example flow diagrams for the operation of server 125. Additional, different, or fewer acts may be provided.

Figure 7:
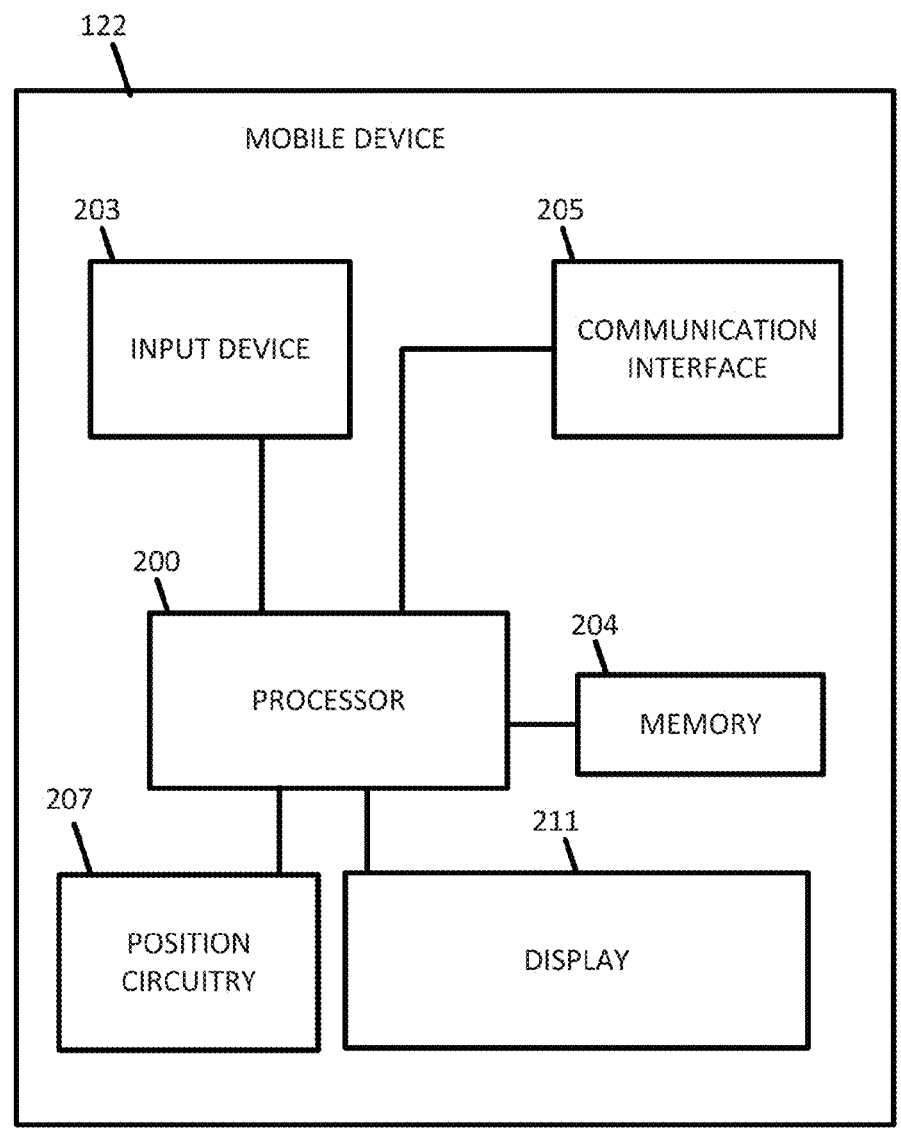
FIG. 7 illustrates an example mobile device of the subject technology for non-rigid alignment.

FIG. 7 illustrates an exemplary mobile device 122 of the system of FIG. 5. The mobile device 122 includes a processor 200, a memory 204, an input device 203, a communication interface 205, position circuitry 207, and a display 211. Additional, different, or fewer components are possible for the mobile device 122.

The mobile device 122 (or navigation device 122) is configured to execute mapping algorithms to determine an optimum route to travel along a road network from an origin location to a destination location in a geographic region that may use maps including large scale scan information. Mobile device 122 may be configured to acquire imagery or other data along with geolocation and pose information. Using input from the end user, the navigation device 122 may examine potential routes between the origin location and the destination location to determine the optimum route. The navigation device 122 may then provide the end user with information about the optimum route in the form of guidance that identifies the maneuvers required to be taken by the end user to travel from the origin to the destination location. Some navigation devices 122 show detailed maps on displays outlining the route, the types of maneuvers to be taken at various locations along the route, locations of certain types of features, and so on.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving an anchor point cloud data set for a geographic area and at least one corresponding point cloud data set for the geographic area, wherein at least a portion of the anchor point cloud data set and at least a portion of the corresponding point cloud data set represent the same physical surface in the geographic area;
    extracting a plurality of surface feature points from the anchor point cloud data set and from the at least one corresponding point cloud data set;
    determining coordinates for each point of the anchor point cloud data set and the at least one corresponding point cloud data set;
    matching surface feature points of the plurality of surface feature points between the anchor point cloud data set and the at least one corresponding point cloud data set;
    aligning the at least one corresponding point cloud data set to the anchor point cloud data set based on the matched surface feature points between the anchor point cloud data set and the at least one corresponding point cloud data set;
    dividing the aligned at least one corresponding point cloud data set and the anchor point cloud data set into a plurality of point cloud data set portions, wherein each point cloud data set portion overlaps with at least one other point cloud data set portion;
    moving matched surface feature points of the corresponding point cloud data set towards the determined coordinates of the matched surface feature points of the anchor point cloud data set; and
    moving remaining points of the at least one corresponding point cloud data set based on the moved matched surface feature points and the determined coordinates for each remaining point.

2. The method of claim 1, wherein each point cloud data set portion of the plurality of point cloud data set portions includes a portion of the anchor point cloud data set and a related portion of the at least one corresponding point cloud data set.

3. The method of claim 1, the method further comprising:
    merging the plurality of point cloud data set portions into a single point cloud data set including each moved surface feature points and each moved remaining point.

4. The method of claim 3, further comprising:
    determining navigational directions based on the merged single point cloud data set; and
    providing the determined navigational directions to an autonomous vehicle.

5. The method of claim 1, wherein the divided plurality of overlapping point cloud data set portions contain substantially uniform divisions based on a number of points.

6. The method of claim 1, wherein the divided overlapping point cloud data set portions are based on a density of surface feature points.

7. The method of claim 1, wherein determining coordinates for each point further comprises is the difference between a mean value neighboring points and each point.

8. The method of claim 1, wherein the extracted surface feature points represent corners in the physical area.

9. The method of claim 1, wherein aligning the plurality of point cloud data scans based on matching surface feature points is based on quadratic energy functional minimization.

10. The method of claim 1, wherein the determined coordinates are based on a location of neighboring points.

11. An apparatus comprising:
    at least one processor; and
    at least one memory including computer program code for one or more programs;
    the at least one memory and the computer program code configured to, with the at least one processor, cause the apparatus to at least perform:
        receive an anchor point cloud data set and at least one corresponding point cloud data set, wherein at least a portion of the anchor point cloud data set and at least a portion of the corresponding point cloud data set represent the same physical surface;
        extract a plurality of surface feature points from the anchor point cloud data set and from the at least one corresponding point cloud data set;
        determine coordinates for each point of the anchor point cloud data set and the at least one corresponding point cloud data set;
        match surface feature points of the plurality of surface feature points between the anchor point cloud data set and the at least one corresponding point cloud data set;
        align the at least one corresponding point cloud data set to the anchor point cloud data set based on the matched surface feature points between the anchor point cloud data set and the at least one corresponding point cloud data set;
        divide the aligned at least one corresponding point cloud data set and the anchor point cloud data set into a plurality of point cloud data set portions, wherein each point cloud data set portion overlaps with at least one other point cloud data set portion;
        for each point cloud data set portion, move matched surface feature points of the corresponding point cloud data set toward the determined coordinates of the matched surface feature points of the anchor point cloud data set; and
        for each point cloud data set portion, move the remaining points of the at least one corresponding point cloud data set based on the moved matched surface feature points and the determined coordinates for each remaining point.

12. The apparatus of claim 11, wherein each point cloud data set portion of the plurality of point cloud data set portions includes a portion of the anchor point cloud data set and a related portion of the at least one corresponding point cloud data set.

13. The apparatus of claim 11, the at least one memory and the computer program code configured to, with the at least one processor, cause the apparatus to at least perform:
merge the plurality of point cloud data set portions into a single point cloud data including each moved surface feature points and each moved remaining point.

14. The apparatus of claim 11, wherein the divided plurality of overlapping point cloud data set portions contain substantially uniform divisions based on a number of points.

15. The apparatus of claim 11, wherein the divided plurality of overlapping point cloud data set portions are based on a density of surface feature points.

16. The apparatus of claim 11, wherein aligning the plurality of point cloud data scans based on matching surface feature points is based on quadratic energy functional minimization.

17. The apparatus of claim 11, wherein the determined coordinates are based on a location of neighboring points.

18. A method comprising:
receiving an anchor point cloud data set and at least one corresponding point cloud data set, wherein at least a portion of the anchor point cloud data set and at least a portion of the corresponding point cloud data set represent the same physical surface;
extracting a plurality of surface feature points from the anchor point cloud data set and from the at least one corresponding point cloud data set;
determining coordinates for each point of the anchor point cloud data set and the at least one corresponding point cloud data set;
matching surface feature points of the plurality of surface feature points between the anchor point cloud data set and the at least one corresponding point cloud data set;
aligning the at least one corresponding point cloud data set to the anchor point cloud data set based on the matched surface feature points between the anchor point cloud data set and the at least one corresponding point cloud data set;
dividing the aligned at least one corresponding point cloud data set and the anchor point cloud data set into a plurality of point cloud data set portions, wherein each point cloud data set portion overlaps with at least one other point cloud data set portion;
moving matched surface feature points of the corresponding point cloud data set towards the determined coordinates of the matched surface feature points of the anchor point cloud data set; and
moving remaining points of the at least one corresponding point cloud data set based on the moved matched surface feature points and the determined coordinates for each remaining point.

19. The method of claim 1, wherein the anchor point cloud data set is collected by a vehicle.

20. The method of claim 1, wherein moving remaining points of the at least one corresponding point cloud data set comprises deforming the at least one corresponding point cloud data set.

* * * * *